United States Patent [19]

Gaskins

[11] Patent Number: 4,787,146

[45] Date of Patent: Nov. 29, 1988

[54] KNIFE WITH CHISEL EDGE

[76] Inventor: Thomas Gaskins, Cypress Knee Museum, Palmdale, Fla. 33944

[21] Appl. No.: 461,450

[22] Filed: Jan. 27, 1983

[51] Int. Cl.$^4$ .............................................. B26B 3/00
[52] U.S. Cl. ........................................ 30/299; 30/351; 30/357
[58] Field of Search ................. 30/299, 351, 357, 313; D7/137, 140, 142, 152

[56] References Cited

U.S. PATENT DOCUMENTS

| D. 27,640 | 9/1897 | Almeten | D7/152 |
|---|---|---|---|
| 34,565 | 5/1901 | Demarest | 16/384 X |
| 51,772 | 2/1918 | Berkshire | 297/276 |
| D. 208,990 | 10/1967 | Anderson | 30/299 X |
| 245,150 | 8/1881 | Fowler | 30/357 |
| 700,617 | 5/1902 | Cobaugh | 30/357 X |
| 706,107 | 8/1902 | Prentiss | 30/123.7 X |
| 960,624 | 6/1910 | Compton | 30/299 |
| 2,692,428 | 10/1954 | Morishita | 30/299 X |

*Primary Examiner*—Frank T. Yost
*Assistant Examiner*—Willmon Fridie, Jr.
*Attorney, Agent, or Firm*—Mason, Fenwick & Lawrence

[57] ABSTRACT

A knife includes a handle and a blade with the blade having a handle enclosed portion and a first sharp edge including a substantially linear edge portion and a curved end portion; a second sharp or chisel edge of linear configuration extends in from an opposite flat back edge. A flat linear guide edge surface extends between the outer end of the curved end portion and the inner end of the second shaft edge and is oriented relative to the second edge at an angle in the range of 75° to 85°.

11 Claims, 1 Drawing Sheet

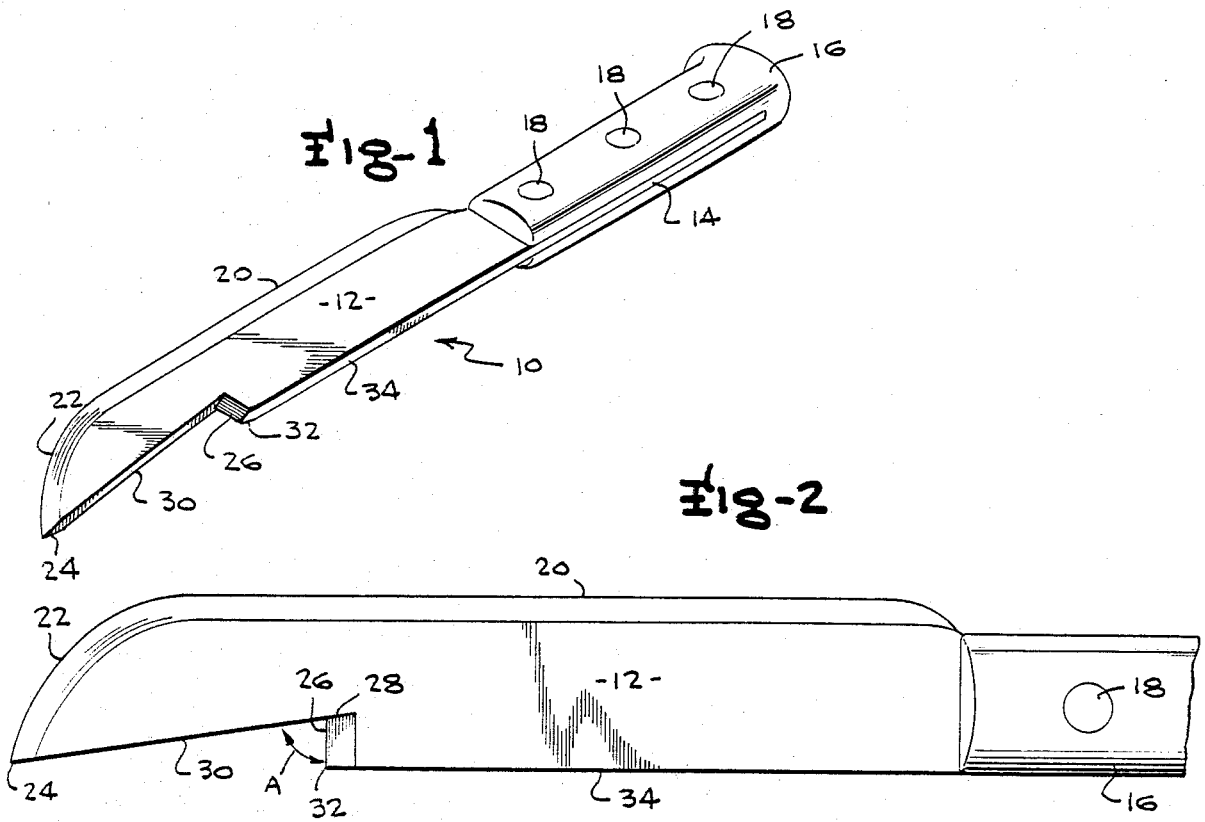
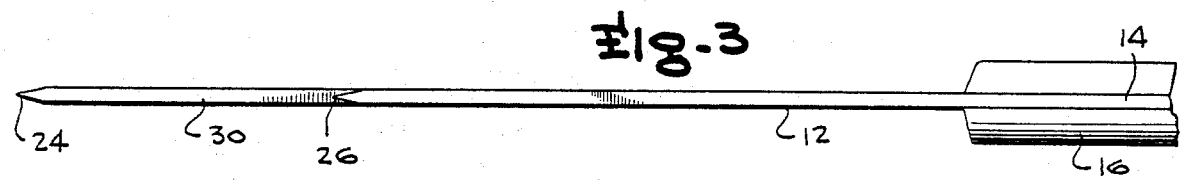
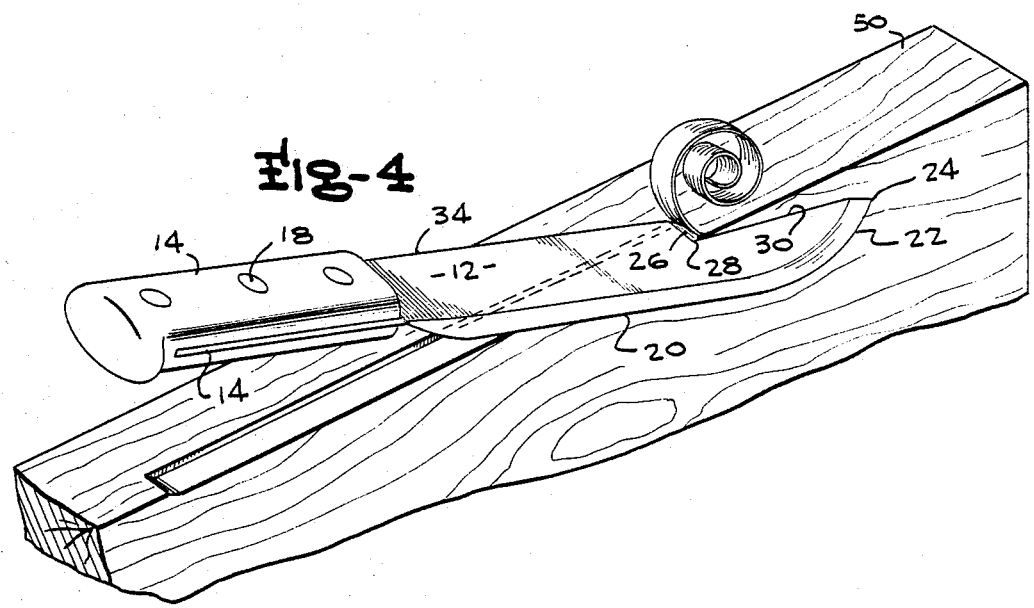

KNIFE WITH CHISEL EDGE

BACKGROUND OF THE INVENTION

The present invention is in the field of hand tools and implements and is more specifically directed to a unique knife construction employing a conventional cutting edge and a chisel edge.

Prior known devices such as exemplified by Berkshire Design Patent No. Des. 51,772 have employed knife blades having auxiliary cutting edges. Other prior devices providing similar teachings include Demarest Design Pat. No. Des. 34,565 and Prentiss Pat. No. 706,107. However, the prior art devices are not uniformly capable of providing a cutting and a chiseling function with a high degree of accuracy, and it is the primary object of the present invention to provide a tool in the form of a knife having a conventional cutting blade portion and a chisel blade portion, both of which are capable of providing their respective functions in an accurate and easy to accomplish manner.

Therefore, it is the primary object of the present invention to provide a new and improved knife and chisel combination tool.

SUMMARY OF THE INVENTION

Achievement of the object of the present invention is enabled through the provision of a tool including a knife blade having a handle enclosed end portion and an exposed blade portion. The exposed blade portion comprises a first sharp edge extending along a linear edge portion joined at one end to the handle enclosed portion and at an opposite end to a curved end edge portion. The exposed blade portion also includes a flat back edge which is oriented in a plane parallel to the plane of the linear portion of the first sharp edge and has an inner end connected to the handle enclosed portion of the blade and an outer end terminating approximately one-third of the length of the exposed blade portion in from the outer end of the exposed blade member. A second sharp or chisel edge extends inwardly perpendicularly from the outer end of the flat back edge and is consequently perpendicular to the linear edge portion of the first sharp edge. A flat guide edge extends outwardly from the inner end of the second sharp or chisel edge and has its outer edge terminating at the outer extent of the curved end portion of the first sharp edge. The flat guide edge is oriented at an acute angle with respect to the second sharp or chisel edge and can be engaged with the side of a piece of wood to position the second sharp or chisel edge at an acute angle relative to the wood for providing effective cutting of the wood upon forward movement of the blade under the control of the user. The invention is also usable for pruning and other similar operations.

A better understanding of the preferred embodiment will be achieved when the following detailed description is considered in conjunction with the appended drawings in which like reference numerals are used for the same parts as illustrated in the different figures of the drawings.

BRIEF DESCRIPTION OF THE DRAWING

FIG. 1 is a perspective view of the preferred embodiment of my invention;

FIG. 2 is a front elevation view thereof;

FIG. 3 is a bottom plan view thereof; and

FIG. 4 is a perspective view illustrating the usage of the preferred embodiment.

DESCRIPTION OF THE PREFERRED EMBODIMENT

The preferred embodiment of the invention, generally designated 10, comprises a knife-like implement which includes a chisel blade. More specifically, a knife blade 12 includes a handle enclosed portion 14 to which a handle 16 is connected and attached by rivets 18 or other conventional means. Additionally, blade 12 includes a first sharp edge comprising a substantially linear edge portion 20 and a curved end edge portion 22 having an outer tip 24. A second sharp or chisel edge 26 has a first end 28 connected with a flat linear guide edge 30 which has an outer end termination at the outer end tip 24 of the curved end portion 22. Additionally, the second sharp or chisel edge 26 has a second, or outer, end 32 which connects to the outer end of a flat back edge 34 of the blade. The inner end of the flat back edge 34 is connected with the handle enclosed portion 14 of the blade.

The relationship between the flat linear guide edge 30 and the second sharp or chisel edge 26 is quite critical in that the flat linear guide 30 is oriented at an angle A relative to the cutting edge 26 which angle is in the range of 75° to 85°. Consequently, when the flat guide edge 30 is positioned against the edge of a piece of lumber 50 or the like as shown in FIG. 4, the cutting edge 26 is canted at an acute angle relative to the lumber and forward movement in the direction of the knife blade as shown in FIG. 4 results in an effective cutting of the wood since the cutting edge 26 is automatically canted at an optimum angle relative to the wood which angle is the same as angle A.

Additionally, the preferred embodiment can also be used for cutting and pruning by simply positioning the outer portion of flat guide edge 30 in contact with a limb or the like having a diameter less than the length of the second or chisel edge 26 and then forwardly moving the implement in the direction of the length of the blade so as to cause the sharp edge 26 to engage the limb to be cut and consequently rapidly sever same.

Thus, it will be seen that the present invention provides a unique tool capable of multiple uses but which does not occupy any greater space than a conventional knife. Consequently, the implement can be maintained in a conventional sheath or the like. While numerous modifications of the preferred embodiment will undoubtedly occur to those of skill in the art, it should be understood that the spirit and scope of the invention is to be limited solely by the appended claims.

I claim:

1. A knife including a handle and a blade, said blade comprising a metal blade having a handle enclosed portion, a first sharp edge having a substantially linear edge portion and a curved end portion, a second sharp or chisel edge having first and second ends and extending in a linear manner substantially perpendicular to said linear edge, and a flat linear guide edge surface extending between one end of said curved end portion and said first end of said second sharp edge.

2. A knife including a handle and a blade, said blade comprising a metal blade having a handle enclosed portion, a first sharp edge having a substantially linear edge portion and a curved end portion, a second sharp or chisel edge having first and second ends and extending in a linear manner substantially perpendicular to said linear edge, and a flat linear guide edge surface extending between one end of said curved end portion and said first end of said second sharp edge, and a flat back edge extending between said second end of said second sharp edge and said handle enclosed portion.

3. A knife as recited in claim 2 wherein said linear edge portion of said sharp edge and said flat back edge are substantially parallel to each other.

4. A knife as recited in claim 3 wherein the angle between said linear guide edge surface and said second sharp or chisel edge is in the range of 75° to 85°.

5. A knife as recited in claim 2 wherein said flat back edge and said second sharp or chisel edge are substantially perpendicular to each other.

6. A knife as recited in claim 5 wherein said linear edge portion of said sharp edge and said flat back edge are substantially parallel each to the other.

7. A knife as recited in claim 6 wherein the angle between said linear guide edge surface and said second sharp or chisel edge is in the range of 75° to 85°.

8. A knife as recited in claim 2 wherein the extreme outer end of said curved end portion is coplanar with said flat back edge.

9. A knife as recited in claim 8 wherein said linear edge portion of said sharp edge and said flat back edge are substantially parallel to each other.

10. A knife as recited in claim 9 wherein the angle between said linear guide edge surface and said second sharp or chisel edge is in the range of 75° to 85°.

11. A knife as recited in claim 10 wherein said flat back edge and said second sharp or chisel edge are substantially perpendicular to each other.

* * * * *